April 4, 1961 N. E. RISK ET AL 2,978,051
FINAL DRIVE ASSEMBLY FOR TRACK-TYPE TRACTORS
Filed Jan. 28, 1960
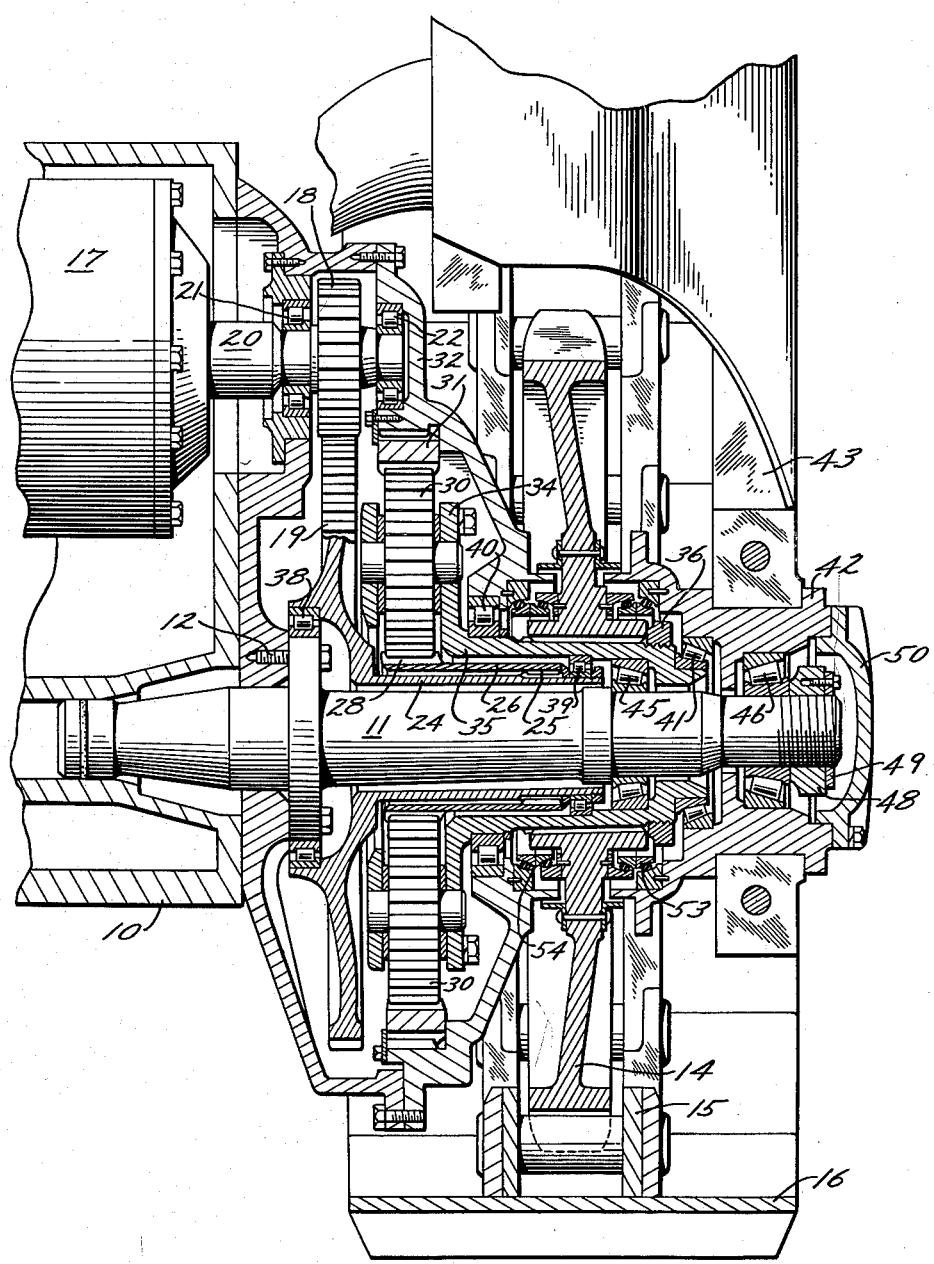
INVENTORS
NORMAN E. RISK
JOHN H. McCARTHY
BY
Charles M. Fryer
ATTORNEY

United States Patent Office 2,978,051
Patented Apr. 4, 1961

2,978,051

FINAL DRIVE ASSEMBLY FOR TRACK-TYPE TRACTORS

Norman E. Risk and John H. McCarthy, Peoria, Ill., assignors to Caterpillar Tractor Co., Peoria, Ill., a corporation of California Filed Jan. 28, 1960, Ser. No. 5,213

3 Claims. (Cl. 180—9.62)

This invention relates to the final drive or sprocket mounting for track-type tractors and particularly to the arrangement of bearings in such an assembly which support the sprocket with respect to a non-rotatable shaft and permit oscillation of the track frame with respect to the same shaft.

It is desirable that the bearings for the track frame and those for the sprocket be capable of adjustment simultaneously after they are in their assembled position as taught by our earlier United States Patent No. 2,702,603, entitled "Bearing Mounting for Tractor Driving Members."

It is the object of the present invention to provide a simplified and economical final drive assembly having the adjustment characteristics referred to above.

A further object of the invention is to provide such an assembly in which the track frame bearings may be removed without removal of the sprocket bearings or any part of them so that seals and other parts associated with the sprocket can be serviced without disturbing the support of the sprocket.

A further object of the invention is to increase the serviceability of final drive assemblies of the kind described by enabling the use of relatively small bearings in which misalignment and wear due to shaft deflection is minimized.

Further and more specific objects and advantages of the invention are made apparent in the following specification wherein reference is made to the accompanying drawing.

The drawing is a central sectional view through a final drive assembly embodying the present invention.

In the drawing, a portion of a final drive housing of a track-type tractor is illustrated at 10 as supporting a non-rotatable sprocket shaft 11 held in place by cap screws 12 which are threaded into a gear case secured to the side of the housing 10 by means not shown. A drive sprocket 14 is mounted for rotation relative to the shaft 11 and meshes with the usual track links 15 secured to and forming an endless articulated track with the shoes 16. Power from the tractor engine drives the sprockets through conventional drive mechanism including a steering clutch, disposed in a housing 17 within the final drive housing, which controls power to a pinion gear 18 thence through a large reduction gear 19 and further reduction gearing in the form of a planetary train. A shaft 20 which connects the steering clutch and pinion gear 18 is journaled in suitable bearings as illustrated at 21 and 22.

The large reduction gear 19 has an integrally formed hollow or quill shaft 24 which extends outwardly in concentric relation to the non-rotatable sprocket shaft 11. Adjacent to its outer end it has a splined connection 25 with a quill shaft 26 extending inwardly in concentric relation to the quill 24 and supporting an integrally formed sun gear 28 of a planetary train which includes planet gears 30 in mesh with the sun gear and with a ring gear 31 suitably secured against rotation within the gear housing cover shown at 32. The planet gears 30 are rotatably carried in a planet carrier 34 which also has a quill-like extension 35 which extends outwardly and supports the sprockets 14 through a splined connection with its hub and a nut 36 threaded on the quill 35 engaging the outer portion of the sprocket hub. The large reduction gear 19 is supported by two roller bearings 38 and 39, the latter being at the outer end of the quill 24 and disposed between that quill and the quill 35 of the planet carrier 34. The planet carrier has an inner supporting bearing 40 of the roller type and an outer tapered roller bearing 41. The outer race of the tapered roller bearing 41 is supported in an outer housing member 42 disposed in the outer track frame, a portion of which is illustrated at 43, and secured in place therein by a clamping member (not shown). Another tapered roller bearing 45 is disposed between the inner surface of the carrier quill 35 and the shaft 11. Adjacent the outer end of the shaft a third tapered roller bearing 46 provides a pivotal support between the outer housing member 42 and the shaft which permits oscillation of the track frame and entire track assembly about the non-rotatable sprocket shaft 11 to permit limited vertical movement of the forward ends of the tracks as the tractor moves over uneven terrain.

A nut 48 threaded to the outer end of the sprocket shaft 11 and held against rotation by a conventional lock plate 49 is employed to adjust the clearance or load on all of the tapered roller bearings 41, 45 and 46 simultaneously, and is protected by a cover plate 50 removably secured to the outer housing 42.

The particular arrangement of bearings 41, 46 and 45, the latter of which is a part of and assembled with the reduction gear train while bearings 41 and 46 are assembled with the outer housing 42, forms a compound bearing mounting which is capable of adjustment or being preloaded by the single nut 48. The slight axial clearance allowed in the straight roller bearings 38 and 39 allows the planet carrier 34 and its quill 35 to move in an axial direction sufficiently to accommodate the adjusting movement of the outer race of the tapered roller bearing 45. With this arrangement, any thrust load on the three tapered roller bearings received through the track roller frame will always be distributed in substantially equal amounts to at least two of them. As all of these bearings are of relatively small diameter compared to bearings previously used in assemblies of this kind, their misalignment due to flexing of the sprocket shaft is minimized and destructive wear of the bearings is thus reduced.

A further advantage of the assembly herein disclosed is that the outer housing 42 may be removed without disturbing the positions of the various components of the reduction gear train and therefore, may be replaced without the usual necessity of supporting the sprocket in its normal position during the time that the outer housing is removed. Removal of the outer housing facilitates servicing components which are obstructed by it such for example as lubricant seals, typical ones of which are illustrated at 53 and 54 at opposite sides of the sprocket.

We claim:

1. In a final drive assembly for a track-type tractor which comprises a non-rotatable sprocket shaft extending between a final drive housing and a track frame, a sprocket rotatable with respect to said shaft, and reduction gearing including a quill concentric to the shaft and supporting the sprocket, a first tapered roller bearing forming a direct supporting connection between the quill and the shaft, an outer housing element surrounding a part of the quill and shaft and carried by the track frame, a second tapered roller bearing forming a direct supporting connection between the quill and the outer housing, and a third tapered roller bearing between the outer housing and the shaft.

2. In a final drive assembly for a track-type tractor which comprises a non-rotatable sprocket shaft extending between a final drive housing and a track frame, a sprocket rotatable with respect to said shaft, and reduction gearing including a quill concentric to the shaft and supporting the sprocket, a first tapered roller bearing between the quill and the shaft, an outer housing element surrounding a part of the quill and shaft and carried by the track frame, a second tapered roller bearing between the quill and the outer housing, a third tapered roller bearing between the outer housing and the shaft, and a nut threaded on the shaft and engageable with the said third tapered roller bearing to adjust the load thereon and simultaneously adjust the load on the second and first roller bearings by thrust applied through the outer housing member and said quill.

3. A final drive assembly as set forth in claim 1 in which the outer housing and the said second and third tapered roller bearings are removable independently of the said first tapered roller bearing.

References Cited in the file of this patent
UNITED STATES PATENTS

| | | |
|---|---|---|
| 2,702,603 | Risk et al. | Feb. 22, 1955 |
| 2,757,746 | Biedess | Aug. 7, 1956 |